United States Patent [19]

Goyer et al.

[11] 3,821,144
[45] June 28, 1974

[54] ASPHALTIC COMPOSITIONS
[75] Inventors: Andre Goyer, Lillebonne; Rene Smadja, Notre Dame de Gravenchon, both of France
[73] Assignee: Mobil Oil Corporation, New York, N.Y.
[22] Filed: Mar. 30, 1973
[21] Appl. No.: 346,515

[30] Foreign Application Priority Data
May 12, 1972 France .............................. 72.17034

[52] U.S. Cl. ..................... 260/28.5 AS, 117/132 C
[51] Int. Cl. ............................................. C08f 45/52
[58] Field of Search... 260/28.5 AS, 28.5 AV, 27 R, 260/27 EV; 106/273 R, 279

[56] References Cited
UNITED STATES PATENTS

| | | | |
|---|---|---|---|
| 2,188,204 | 1/1940 | Marc | 260/27 R |
| 2,648,644 | 8/1953 | McMillian | 106/273 R |
| 3,177,164 | 4/1965 | Mills | 260/28.5 AV |
| 3,309,329 | 3/1967 | Schultz | 260/28.5 AV |
| 3,344,101 | 9/1967 | Roediger | 260/28.5 AV |
| 3,442,841 | 5/1969 | Adelman | 260/28.5 AS |

Primary Examiner—Allan Lieberman
Assistant Examiner—P. R. Michl
Attorney, Agent, or Firm—Andrew L. Gaboriault; Benjamin I. Kaufman; Raymond W. Barclay

[57] ABSTRACT

Asphaltic compositions, having improved elastic properties, are provided comprising a major amount of asphalt, a minor amount of a copolymer of ethylene and vinyl acetate and a minor amount of a synthetic terpenic resin.

6 Claims, 3 Drawing Figures

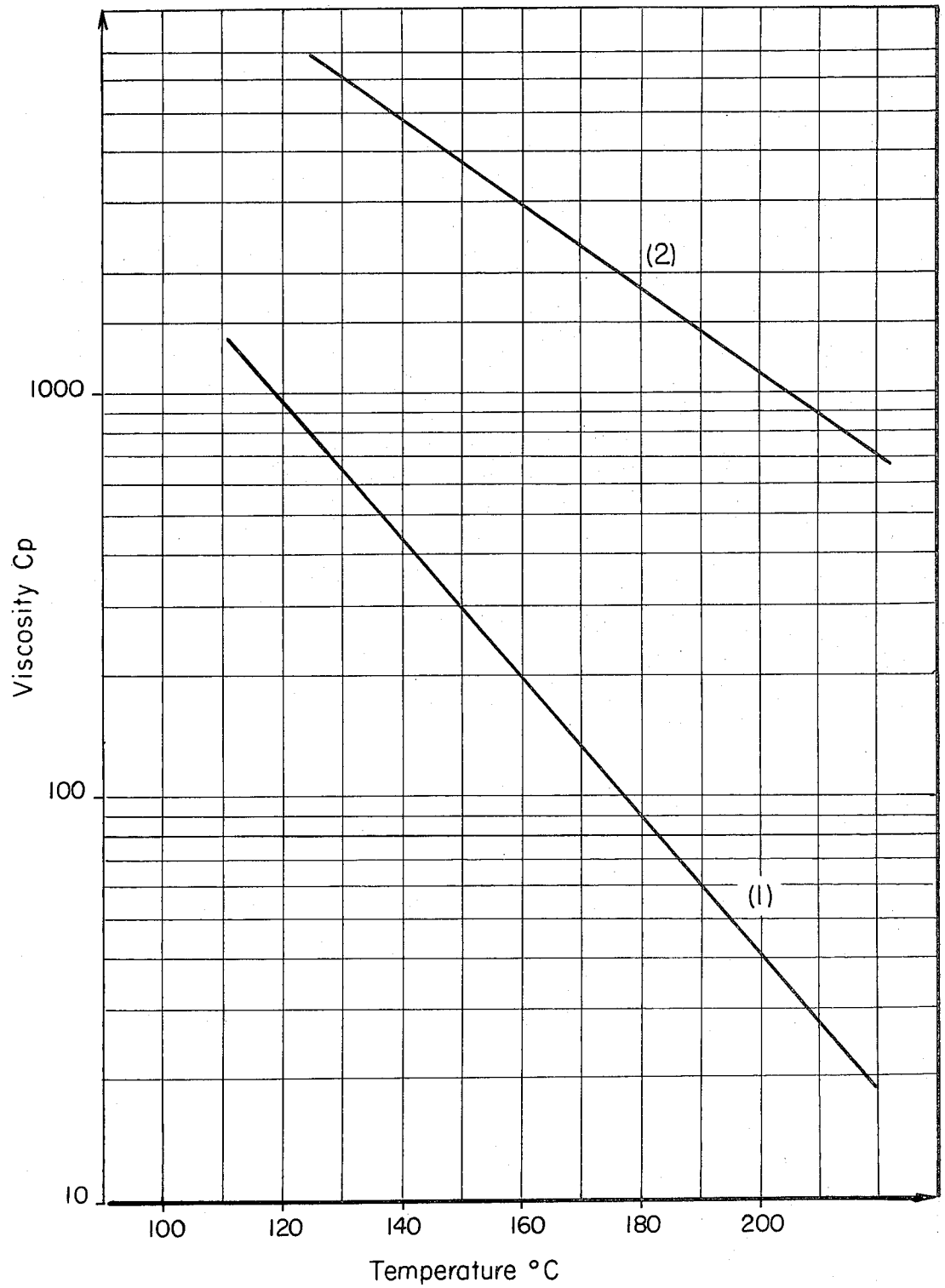
FIG. 3    VISCOSITY/TEMPERATURE CURVES
(1) 40/50 Asphalt Grade
(2) Asphalt + E.V.A. + Resin

ASPHALTIC COMPOSITIONS

CROSS REFERENCE TO RELATED APPLICATIONS

Convention application of Application No. 72/17034, filed May 12, 1972, in France, priority for which is claimed.

BACKGROUND OF THE INVENTION

1. Field of the Invention.

This invention relates to asphaltic compositions and, in one of its aspects, relates more particularly to asphaltic compositions which exhibit improved elastic properties. Still more particularly, in this aspect, the invention relates to asphaltic compositions exhibiting improved elastic properties and suitable for use in such applications where criteria of suppleness and high mechanical resistance must be satisfactorily met.

2. Description of the Prior Art.

The use of asphalt binders for road-building and other various industrial applications, is known. These products have, however, heretofore exhibited weak elastic properties, thus limiting their use in fields where the aforementioned criteria of suppleness and high mechanical resistance are a necessary requirement. In this regard, it has, heretofore, been proposed to incorporate various additives in the asphaltic composition for increasing the desired elasticity. For such purposes, copolymers of ethylene and vinyl acetate have been proposed, for example, as disclosed in U.S. Pat. No. 3,442,841. It is found, however, that although the incorporation of copolymers of ethylene and vinyl acetate enables the elasticity of the asphalt to be increased, it also produces asphaltic compositions which present insufficient cohesion (i.e., stress necessary for a given deformation) and also weak adhesiveness.

SUMMARY OF THE INVENTION

In accordance with the present invention, there are provided new and improved asphaltic compositions, possessing improved elasticity, good cohesive properties and sufficient adhesiveness rendering these materials useful in numerous fields of application, including coatings for various surfaces, metal-work and particularly on orthotropic surfaces.

In general, the improved asphaltic compositions of the present invention comprise a major amount of asphalt, a minor amount of a copolymer of ethylene and vinyl acetate and a minor amount of a synthetic terpenic resin. In its more specific applications, the improved asphaltic compositions, in general, comprise, by weight, from about 50 to about 94 percent asphalt, from about 5 to about 40 percent of a copolymer of ethylene and vinyl acetate and from about 1 to about 30 percent of a synthetic terpenic resin.

The copolymers of ethylene and vinyl acetate, which are employed in the asphaltic compositions of the present invention preferably comprise from about 10 to about 50 percent, by weight, of units derived from the copolymerized vinyl acetate. Particularly preferred as copolymers of ethylene and vinyl acetate which have a melt index of from about 20 to 30, determined in accordance with A.S.T.M. Method D638.

The synthetic terpenic resins employed in the novel asphaltic compositions of the present invention, are resins derived from terpenic raw materials such as turpentine, pine oil, and related materials. The principal constituent of turpentine is a terpene or pinene. The principal constituent of pine oil is a mixture of terpene alcohols (largely alphaterpineol) with small amounts of terpene hydrocarbons and ethers. The pine oil, for this purpose, is obtained by steamed-distillation of pine wood. In addition to the recovery of pine oil and turpentine as employed in the aforementioned process, other terpene hydrocarbons such as limonene, dipentene, terpinene and terpinolene are also obtained as intermediate fractions.

The principal methods for producing resinous materials from the aforementioned substances are by oxidation or by polymerization. In this respect, it is found that turpentine tends to resinify during storage, probably because of oxidation. The evaporation of turpentine and pine oils in open vessels yields resinous materials as a result of oxidataion and polymerization. A more complete description of the aforementioned synthetic terpenic resins, as employed in the novel asphaltic compositions of the present invention can be found in "The Chemistry of Synthetic Resins," by Carleton Ellis, Vol. I, Rheinhold Publishing Corporation, New York, N.Y., 1935.

The synthetic terpenic resin, employed in the novel asphaltic compositions of the present invention, preferably has a softening point (Ring and Ball) from about 50° to about 200°C. Still more particularly preferred are synthetic resins having a softening point (Ring and Ball) from about 95° to about 105°C. and a density at 25°C. of about 0.93.

The asphalt employed in the novel composition preferably has a softening point (Ring and Ball) from about 50° to about 200°C. Still more particularly preferred, are asphalts whose softening point is between about 43° and about 60°C. and whose ASTM penetration index at 25°C. is from about 40 to about 70.

If so desired, the novel asphaltic compositions of the present invention may be employed, individually, as hereinbefore described, or may include various filler materials and inert aggregates, for imparting additionally desired properties to the composition. These fillers or aggregates, in combination with the aforementioned binder (of asphalt, copolymer and resin) may comprise from about 85 to about 95 percent, by weight, of the total binder-aggregate mixture.

DESCRIPTION OF SPECIFIC EMBODIMENTS

In order to provide a better understanding of the improved properties realized in the use of the novel asphaltic compositions of the present invention, a comparison was made between (1) a pure asphalt having 40/50 penetration, (2) a mixture of this asphalt containing 20 percent, by weight, of a copolymer of ethylene and vinyl acetate containing 33 percent, by weight, of units derived from the vinyl acetate, (3) a mixture of the same asphalt containing 15 percent, by weight, of a synthetic terpenic resin having a softening point of 95° to 105°C. and a density at 25°C. of about 0.93, and, finally, (4) a ternary mixture comprising 75 percent, by weight, of the above-described asphalt, 20 percent, by weight, of the above-described copolymer (E.V.A.) and 5 percent, by weight, of the above-described synthetic terpenic resin.

In this respect, reference is now had to the following:

BRIEF DESCRIPTION OF THE DRAWINGS

The elasticity and cohesion of each of the aforementioned materials were assessed by a conventional test of traction or stress at constant speed.

The results obtained in determining elasticity and cohesion are shown in FIG. 1 of the drawings in which the ordinate axis shows the tensile stress and the abscissa axis shows the deformation. Referring more particularly to FIG. 1, curve 1 represents the tensile stress-deformation relationship for the pure asphalt. Curve 2 is that obtained with a mixture of the same asphalt and the above-described copolymer. Curve 3 is that obtained with the mixture of asphalt and 15 percent, by weight, of the terpenic resin. Curve 4 is that obtained with the mixture in accordance with the present invention which comprises the above-described asphalt, the above-described E.V.A. copolymer and the above-described synthetic terpenic resin.

Figure 1:
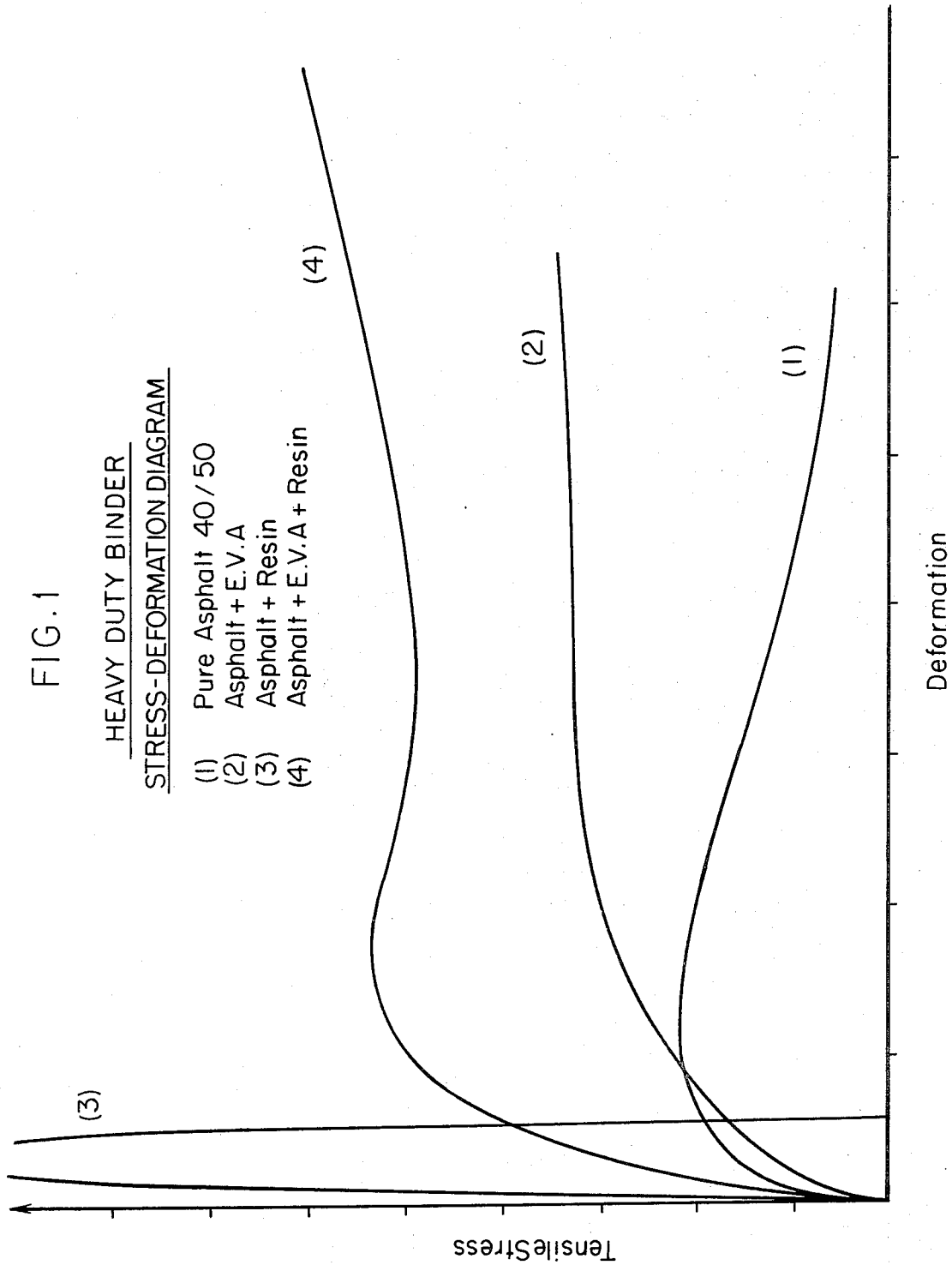
FIG. 1 graphically illustrates the considerable increase in the traction stress obtained by reason of the incorporation of the resin with the asphalt, as well as the increase in the elasticity contributed by the copolymer. The results further show that the mixture of asphalt, copolymer and resin possesses a cohesion and a degree of elasticity clearly superior to that of the pure asphalt or mixture of asphalt and E.V.A. copolymer alone or mixture of asphalt and terpenic resin alone. The terpenic resin employed was obtained by the catalytic polymerization of alpha and beta pinenes occurring in turpentine.
Figure 2:
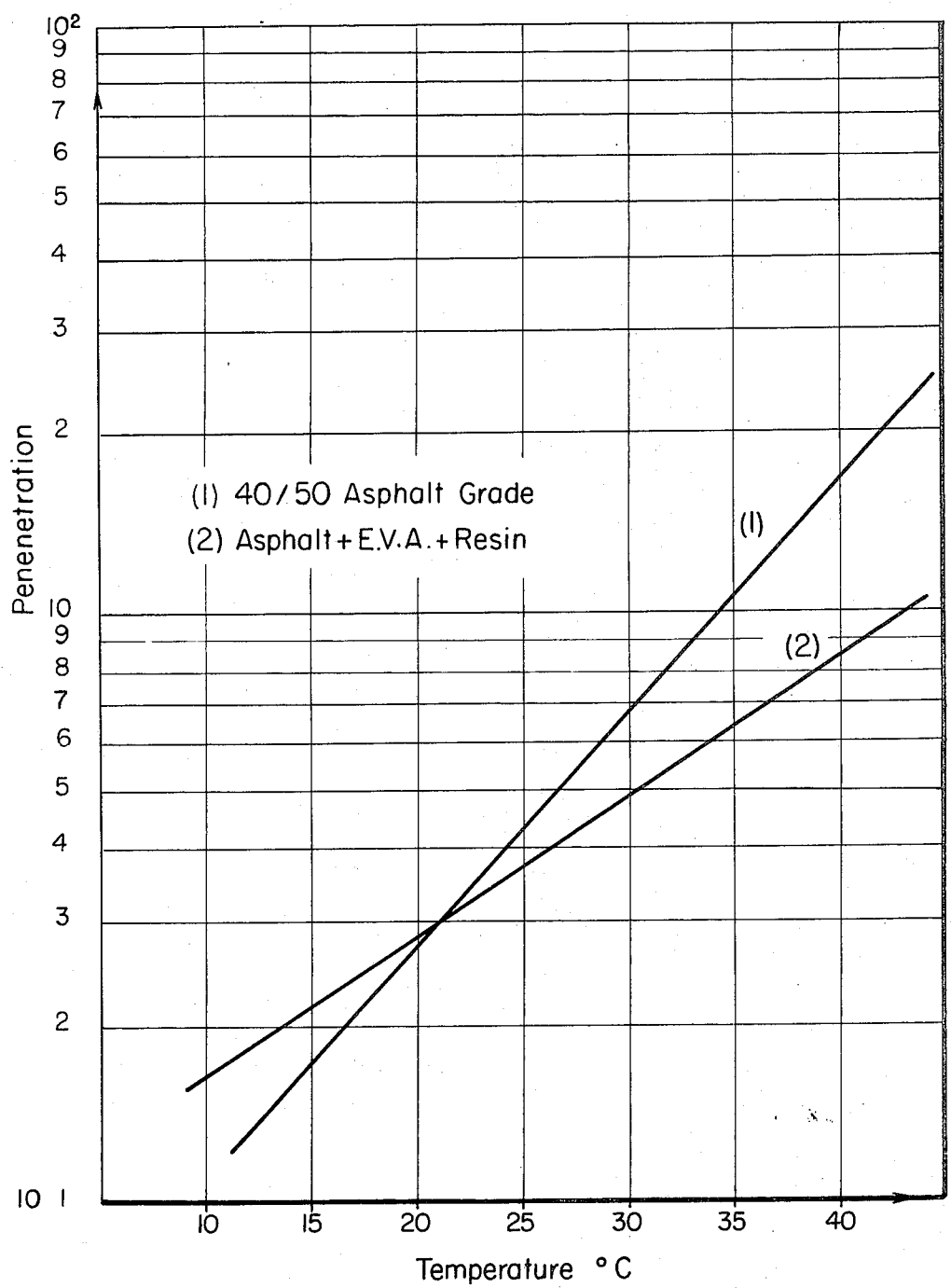

The susceptibility to heat of the mixtures, according to the present invention, is lower than that of the pure untreated asphalt. This is apparent from the curves of FIG. 2 which show the variation of the penetration as a function of the temperature where such temperatures fall between about 10° and 40°C. The higher L.C.P.C. index of penetration of the pure asphalt expresses a greater susceptibility to heat for this binder and is confirmed by the Pfeiffer penetration indices. In this respect, the L.C.P.C. index has reference to the viscosity index values developed by the French Bureau of Public Roads. The Pfeiffer penetration index is indicative of temperature severity expressed by an index figure according to the relationship:

$$a = d \log \text{penetration}/d \text{ temperature}$$

or $$20 - P.I./10 + P.I. \times 1/50$$

in which $d$ is the mathematical derivative and P.I. is the penetration index. A more complete definition of the Pfeiffer penetration index is found in the "The Properties of Asphaltic Bitumen" by J. P. H. Pfeiffer, published by Elsevier Publishing Co. (1950), New York, N.Y., Page 166.

The curves of FIG. 3, show the variation in the viscosity of the asphalt and a mixture, according to the invention, as a function of the temperature, between about 100° and 220°C. It is thus ascertained that the viscosity of the binder at a given temperature is always higher than that of the pure asphalt, and that its variation, as a function of the temperature is lower.

It was also ascertained that the mixtures, prepared in accordance with the present invention, have a fragility at low temperatures which is less than that of the pure asphalt serving as a base for these mixtures, and that the L.C.P.C. interval of plasticity, which expresses the range of temperature within which the product, in question, has a certain suppleness, is much wider for the mixtures prepared in accordance with the invention, than that for the pure asphalt serving as a base for these mixtures.

As hereinbefore indicated, the novel asphaltic compositions of the present invention are particularly useful in such applications as coatings for orthotropic surfaces. In this respect, these compositions can be effectively employed as metallic bridge-paving materials, where orthotropic plate superstructures are employed. These plates are referred to as orthotropic when their mechanical properties are not similar in two perpendicular directions. Such plates are longitudinally supported by a series of stiffeners separated from one another by specific distances.

The pavement of these metallic bridges is therefore subjected to stresses caused by traffic. These include vertical compressive stresses, which are damaging to the pavement when laid on a stiff support such as steel plate, and also to horizontal stresses due to the strain applied by the wheels of motor cars. With the foregoing in mind, it is found that the novel asphaltic compositions of the present invention, when employed individually or as binders for aggregate materials, exhibit outstanding cohesiveness, in that the binder only begins to deform due to a relatively high rate of stress, and also exhibit excellent elasticity, in that this material can show a very large degree of deformation without cracking, as well as a relatively high relaxation stress.

While preferred embodiments of the novel asphaltic compositions of the present invention have been described for purposes of illustration, it will be understood that various modifications and adaptations thereof, which will be obvious to those skilled in the art may be made without departing from the spirit of the invention.

We claim:

1. An asphaltic composition comprising, by weight, from about 50 to about 94 percent asphalt, from about 5 to about 40 percent of a copolymer of ethylene and vinyl acetate and from about 1 to about 30 percent of a synthetic terpenic resin.

2. The asphaltic composition of claim 1 characterized in that the copolymer of ethylene and vinyl acetate comprises from about 10 to about 50 percent, by weight, of units derived from the copolymerized vinyl acetate.

3. The asphaltic composition of claim 1 characterized in that the copolymer of ethylene and vinyl acetate has a melt index from about 20 to about 30.

4. The asphaltic composition of claim 1 characterized in that the synethetic terpenic resin has a softening point (Ring and Ball) from about 50° to about 200°C.

5. The asphaltic composition of claim 1 characterized in that said asphalt has a softening point (Ring and Ball) from about 50° to about 200°C.

6. The asphaltic composition of claim 1 characterized in that said asphalt has a softening point (Ring and Ball) from about 43° to about 60°C. and an ASTM penetration index at 25°C. from about 40 to about 70.

* * * * *

PO-1050
(5/69)

UNITED STATES PATENT OFFICE
CERTIFICATE OF CORRECTION

Patent No. 3,821,144      Dated June 28, 1974

Inventor(s) ANDRE GOYER AND RENE SMADJA

It is certified that error appears in the above-identified patent and that said Letters Patent are hereby corrected as shown below:

Col. 1, line 61 "as" should read --are--.

Col. 4, line 55 "synethetic" should read --synthetic--.

Signed and sealed this 8th day of October 1974.

(SEAL)
Attest:

McCOY M. GIBSON JR.
Attesting Officer

C. MARSHALL DANN
Commissioner of Patents